May 8, 1923.
W. H. GRUENHAGEN
1,454,050
WIRE TROLLING LINE AND TWINE WINDER
Filed Aug. 22, 1922
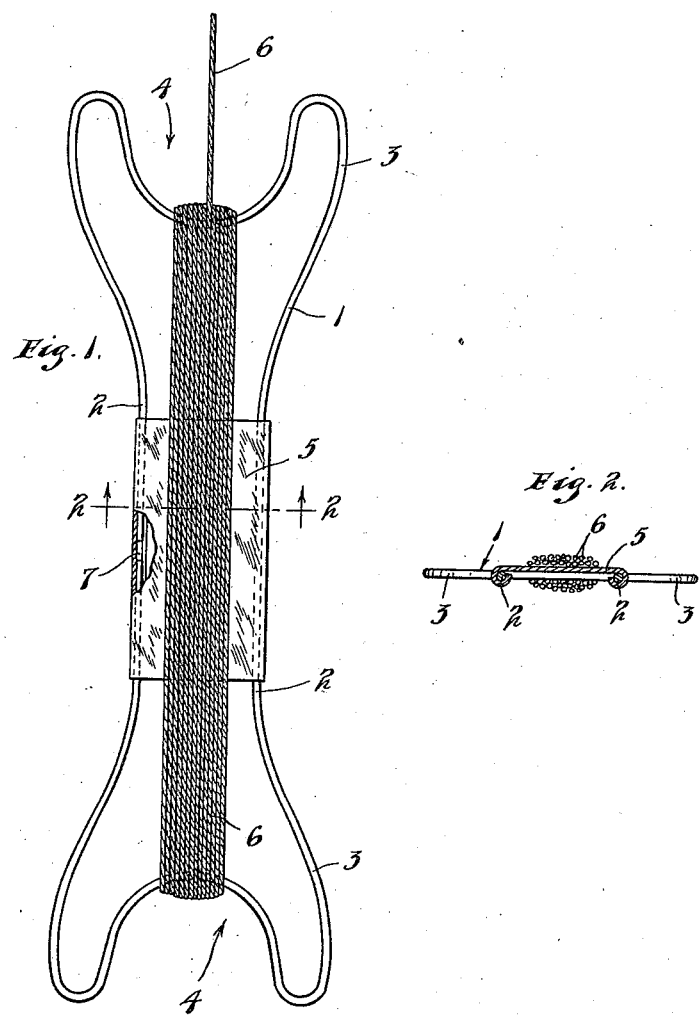
INVENTOR.
WILLIAM H. GRUENHAGEN.
BY HIS ATTORNEY Patented May 8, 1923.

1,454,050

UNITED STATES PATENT OFFICE.

WILLIAM H. GRUENHAGEN, OF ST. PAUL, MINNESOTA.

WIRE TROLLING-LINE AND TWINE WINDER.

Application filed August 22, 1922. Serial No. 583,479.

*To all whom it may concern:*

Be it known that I, WILLIAM H. GRUENHAGEN, a citizen of the United States, residing at St. Paul, in the county of Ramsey and State of Minnesota, have invented certain new and useful Improvements in Wire Trolling-Line and Twine Winders; and I do hereby declare the following to be a full, clear, and exact description of the invention, such as will enable others skilled in the art to which it appertains to make and use the same.

This invention relates to a trolling device and particularly to such a device adapted to be held in the hand during operation. It is a common method of fishing in certain localities to troll the bait from the rear of the boat by means of hand lines and it is often desired to use different lengths of line so that some provision for taking in and letting out the line is necessary.

It is an object of this invention to provide an extremely simple and efficient device on which the line may be arranged and from which it can be very readily let out or released.

It is a further object of the invention to provide such a device in the form of a single wire frame having re-entrant notches or recesses in its ends in which the line, which is wound lengthwise of the frame, is disposed.

It is still another object of the invention to provide such a wire frame having substantially parallel intermediate portions connected by a rigid means, preferably in the form of a flat plate.

These and other objects and advantages of the invention will be fully set forth in the following description made in connection with the accompanying drawings in which like reference characters refer to the same parts throughout the different views, and in which, Fig. 1 is a plan view of the device, a small portion thereof being in section; and Fig. 2 is a vertical section taken on the line 2—2 of Fig. 1.

Refering to the drawings, the device is seen to comprise an elongated frame formed of a strand of wire 1, which frame is disposed substantially in one plane and has intermediate substantially parallel portions 2. The end portions 3 of the frame are expanded or have the sides thereof diverging and are each provided with re-entrant portions forming notches or recesses 4, the sides of which diverge outwardly and meet in a curved inner portion. The parallel sides 2 of the device are connected by a metal plate 5 which extends therebetween and has its side edges bent around said portion. The whole device is preferably galvanized or provided with some non-corrosive coating which coating acts to firmly secure the plate 5 to the wire 1 although this connection may be made by soldering, or otherwise, if desired. It will be noted that the wire frame is substantially continuous, the end portions thereof, as indicated at 7, being closely adjacent each other.

In operation, the line 6 is wound on the frame substantially as indicated in Fig. 1 with one end of the line extending from one end of the frame. It will be noted that the line is disposed in the recesses 4 and held in place therein. The sides of these recesses are, as stated, diverging and as the line is wound thereon it is kept in comparatively flat formation so that it will readily dry. The device is merely held in one hand adjacent its central portion and the line can be paid out therefrom by merely turning the same end for end with a swinging or oscillatory motion. When it is desired to take up the line the same is merely wrapped about the frame, as indicated in Fig. 1.

From the above description it is seen that applicant has provided an extremely simple hand trolling device. The same can be very inexpensively made and thus sold at a low price. The device, as stated, is noncorrosive, readily dries and has no parts which tend to collect dirt, weeds, or other objectionable matter. The bend in the wire at the sides of the recesses 4 and at the ends of the device make a convenient means for hanging the article on one or more nails when it is desired to allow the line to dry thereon. The device being thin, can also be placed in the narrow slot usually provided along the gunwale of the boat where it will be safely held and out of the way. The device has been widely used in actual practice and found exceedingly efficient for the purpose intended. The device can, of course, be used for holding clothes lines or other lines which it may be desired to handle.

It will, of course, be understood, that various changes may be made in the form, details and proportions of the parts without departing from the scope of applicant's invention, which, generally stated, consists in the matter shown and described and set forth in the appended claims.

What is claimed is:

1. A device of the class described comprising, a wire bent to form a frame symmetrical about a longitudinal axis with substantially parallel central portions, and expanded end portions, each end portion having a curved re-entrant recess therein also symmetrical with the longitudinal axis of the frame and rigid means extending between the major part of said parallel portions.

2. A device of the class described comprising, a continuous wire bent to form a frame having substantially parallel central portions and expanded end portions, each end portion having a re-entrant recess therein having a curved outline, and a member of sheet material secured to and extending between the parallel portions of said frame throughout substantially their whole extent.

3. A hand trolling line holder comprising an elongated flat frame formed of a continuous piece of wire, said frame having a central portion and end portions of greater width than the central portion, each of said end portions having an open-ended recess therein, and a plate extending between the central portions of said frame and having its side edges bent around the same and secured thereto.

In testimony whereof I affix my signature.

WILLIAM H. GRUENHAGEN.